United States Patent [19]

Derosset et al.

[11] 3,855,385
[45] Dec. 17, 1974

[54] RECOVERY OF RHENIUM FROM A SPENT CATALYST

[75] Inventors: Armand J. Derosset, Clarendon Hills; Kenneth A. Morgan, Hoffman Estates, both of Ill.

[73] Assignee: Universal Oil Products Company, Des Plaines, Ill.

[22] Filed: Nov. 12, 1973

[21] Appl. No.: 415,063

[52] U.S. Cl. ............ 423/49, 423/54, 423/112, 252/414, 75/101 BE
[51] Int. Cl. ............ C01g 47/00, C01g 39/00
[58] Field of Search ........ 423/49, 54, 112; 252/412, 252/414; 75/101 BE

[56] References Cited
UNITED STATES PATENTS

| | | | |
|---|---|---|---|
| 3,244,475 | 4/1966 | Churchward | 423/49 |
| 3,495,934 | 2/1970 | Ziegenbalg et al. | 75/101 BE |
| 3,672,874 | 6/1972 | Wiley | 75/101 BE |
| 3,763,303 | 10/1973 | Khuri et al. | 423/54 |
| 3,798,305 | 3/1974 | Pagnozzi et al. | 423/54 X |

Primary Examiner—Herbert T. Carter
Attorney, Agent, or Firm—James R. Hoatson, Jr.; Robert W. Welch; William H. Page, II

[57] ABSTRACT

Rhenium is recovered from a spent platinum-rhenium-alumina catalyst containing molybdenum. The spent catalyst is first treated with sulfuric acid to form a rhenium and molybdenum-containing aluminum sulfate solution and a platinum-containing residue. The aluminum sulfate solution is processed through a series of contactors in countercurrent contact with an amine solution. The amine-rhenium mole ratio is controlled within a specified range in the various contactors whereby the rhenium is recovered in the amine phase and the molybdenum is recovered in the aluminum sulfate phase.

7 Claims, 1 Drawing Figure

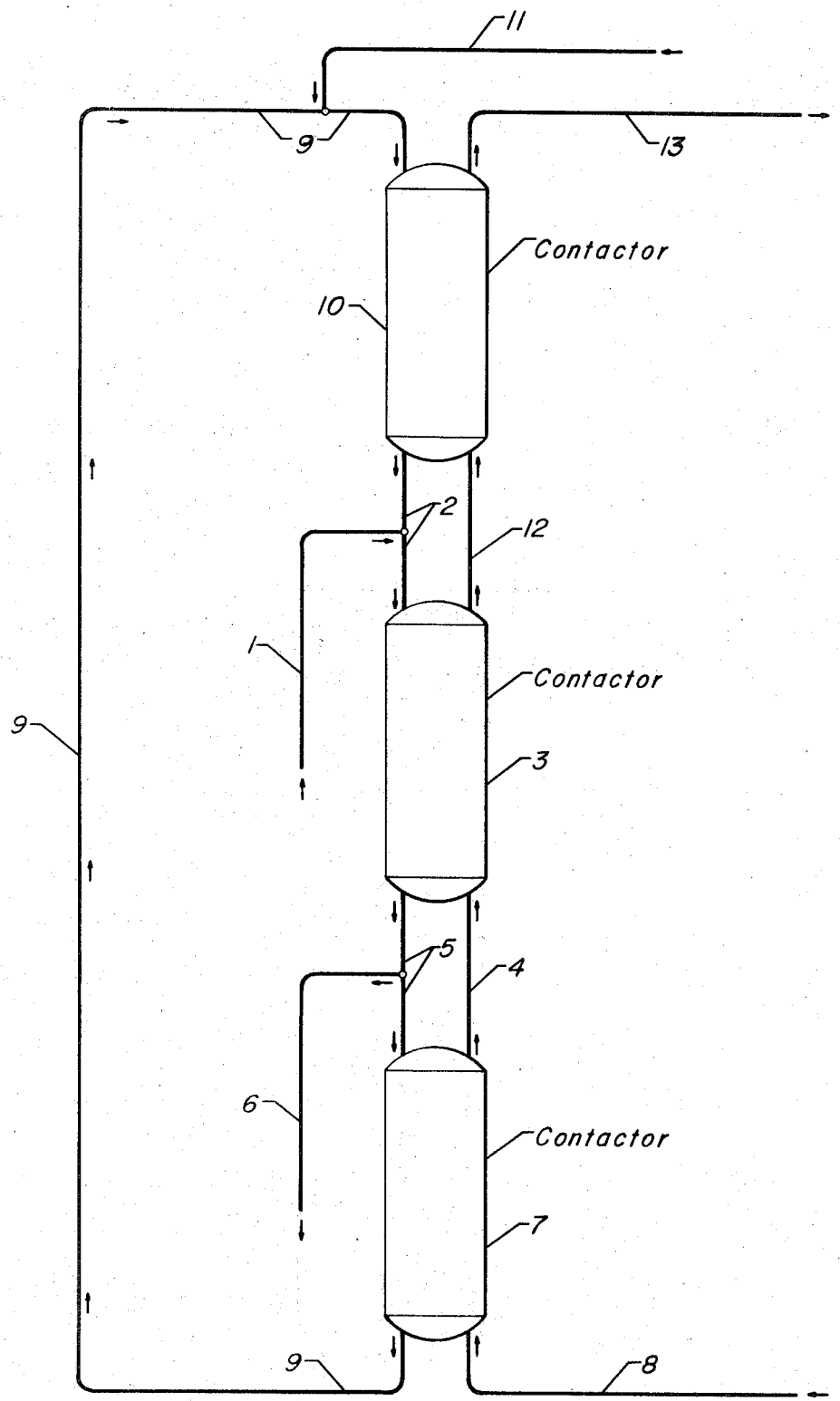

RECOVERY OF RHENIUM FROM A SPENT CATALYST

The present invention relates to the recovery of rhenium from a spent catalyst comprising rhenium in combination with a platinum group metal component on a refractory inorganic oxide support or carrier material.

A variety of commercially important hydrocarbon conversion processes involving cyclization, dehydrocyclization, isomerization, aromatization, hydrogenation, dehydrogenation, etc., of hydrocarbons has heretofore been effectively catalyzed at varied conditions by catalysts consisting essentially of a platinum group metal composited with a refractory inorganic oxide carrier material. More recently, a rhenium component has been included in the catalyst to form a two component catalyst of improved activity, selectivity and/or stability with respect to one or more of the hydrocarbon conversion reactions.

The catalyst so employed invariably becomes deactivated and regeneration is required if the catalyst is to perform its intended function in an ecomical manner. Deactivation may result from any one of a number of conditions peculiar to a particular hydrocarbon conversion process. Usually, deactivation results from an excessive deposition of carbonaceous matter whereby the hydrocarbon being processed is denied access to the active sites of the catalyst composite. While the catalyst can be regenerated with removal of carbonaceous matter by air oxidation, each such regeneration produces a catalyst somewhat less stable than its predecessor. Eventually, regeneration is no longer economically feasible and the spent catalyst must be replaced with a fresh catalyst. The high cost of rhenium and of the platinum group metals, coupled with limited availability, precludes a disposition of the spent catalyst without effecting recovery of substantially all of the rhenium and platinum group metals. This is so although each of the rhenium and platinum group metals may comprise as little as 0.1 wt. % of the total catalyst composite.

Although the description of the method of this invention is presented with reference to the more commonly encountered platinum-containing catalyst, it is understood that the method can be advantageously applied to recover rhenium from other platinum group metal-containing catalyst, for example those containing rhenium in combination with palladium, iridium, osmium, rhodium, ruthenium, and the like. Further, the spent catalysts herein contemplated are generally alumina-based catalysts and the subsequent description of the invention is directed thereto. However, it is again understood that rhenium can be similarly recovered from spent catalyst on other refractory inorganic oxide carrier materials including silica, zirconia, thoria, boria, alumina-silica, alumina-zirconia, alumina-boria, and the like.

It is common practice to recover the platinum group metal component by initially treating the spent catalyst with sulfuric acid whereby the alumina support or carrier material is digested leaving a platinum group metal-containing residue and an alum or aluminum sulfate solution. Preferably, although not necessarily, the spent catalyst is burned free of carbonaceous matter prior to the acid treatment. When, as is most often the case, the platinum group metal is platinum, it is generally preferred to recover the platinum as chloroplatinic acid to facilitate handling, storage, and subsequent reuse in the manufacture of fresh catalyst. Thus, the platinum is recovered from the carbon-free residue on treating the residue with aqua regia. The resulting mixture is subjected to filtration and the filtrate boiled down to remove solvent and yield a chloroplatinic acid concentrate.

When, as herein contemplated, the catalyst further contains a rhenium component, substantially all of the rhenium is found in a soluble form in the alum solution, and the present invention is concerned with the recovery of rhenium therefrom. It is not only essential that the rhenium be recovered but that it be recovered free of the contaminating influence of molybdenum and in a form useful in the manufacture of fresh catalyst.

In one of its broad aspects, the present invention embodies a process for the recovery of rhenium from a molybdenum-containing alum solution which comprises (a) charging said alum solution downwardly through a first contactor column in contact with an amine solution charged upwardly therethrough at conditions to maintain an amine/rhenium mole ratio of from about 1.4 to about 1.8 in the lower portion of said column and extracting substantially all of the rhenium contained in said alum solution; (b) charging the resulting rhenium-containing amine solution upwardly through a second contactor column in contact with an alum solution charged downwardly therethrough and containing sufficient added rhenium to maintain an amine/rhenium mole ratio in the upper portion of said column of from about 0.7 to about 1.2, and stripping substantially all of the molybdenum from said rhenium-containing amine solution, and extracting a major portion of the rhenium contained in said alum solution; (c) charging the resulting molybdenum-containing alum solution downwardly through said first contactor column in admixture with the first mentioned alum solution charged thereto, and separating and recovering the molybdenumfree rhenium-containing amine solution; (d) discharging a portion of the molybdenum-containing alum solution from said first contactor column, and charging the remaining portion downwardly through a third contactor column in contact with an amine solution charged upwardly therethrough, extracting substantially all of the molybdenum contained in said alum solution, and charging the resulting alum solution and added rhenium downwardly through said second contactor column in accordance with step (a), and charging the resulting amine solution upwardly through the second contact column in accordance with step (a).

Other objects and embodiments of this invention will become apparent in the following detailed specification.

The process of this invention is better described with reference to this schematic flow diagram shown in the accompanying drawing. The description with reference to this schematic flow diagram illustrates one embodiment of the invention. It is contemplated that modifications beyond the scope of this flow diagram may be practiced without departing from the generally broad scope of the invention as set out in the appended claims.

The alum, or aluminum sulfate, solution used in the present illustration is a rhenium and molybdenum-containing alum solution resulting from the digestion of a spent platinum-rhenium-alumina catalyst in concentrated sulfuric acid, with a platinum-containing residue having been separated by filtration. The schematic flow diagram shows a liquid-liquid extraction system comprising rotating disc contactors in vertical alignment with the alum solution being gravitated downwardly therethrough in countercurrent contact with an amine solution processed upwardly through the system to be withdrawn and recovered overhead free of molybdenum and containing dissolved rhenium.

The alum solution, containing 130 ppm rhenium and 5-200 ppm molybdenum, is initially charged to the system through line 1 and admixed with an alum solution, hereinafter described, passing downwardly through line 2 from a contactor 10. The combined solution is continued downwardly through line 2 to a first contactor 3 into contact with an amine solution charged upflow from line 4. The amine solution is initially charged to the system through line 8 and passes upwardly through a second contactor 7 to extract molybdenum from the alum solution moving downwardly therethrough as hereinafter described, and the amine solution is then charged upwardly through line 4 to the first contactor 3 as aforesaid. The amine solution is initially charged to the system in an amount to maintain an amine/rhenium mole ratio of from about 1.4 to about 1.8 at the bottom of contactor 3 whereby essentially all of the rhenium is extracted from the alum solution before the solution is discharged from the contactor 3 by way of line 5.

The amines utilized herein are those commonly employed in solvent extraction processes taking advantage of the salt-forming tendency of the amine functional group to form, for example, rhenium salts. In solvent extraction processes such as herein contemplated, the amines are generally employed dissolved in a water-insoluble organic solvent, typically benzene, toluene, kerosine, methylisobutylketone, and the like. Suitable amines for use herein particularly include water immiscible primary, secondary, tertiary and quarternary aliphatic amines and amine salts comprising aliphatic chains in the $C_4$-$C_{18}$ range, for example triisobutylamine, di-n-pentylamine, diisopentylamine, tri-n-pentylamine, triisopentylamine, n-hexylamine, di-n-hexylamine, trihexylamine, triheptylamine, n-octylamine, dioctylamine, trioctylamine, tridecylamine, didodecylamine, methyltridecylamine chloride, and the like. Tertiary aliphatic amines like tri-n-decylamine, and quaternary aliphatic amines, like methyltridecyl ammonium chloride, are preferred. The amine solution utilized in the present example comprises 50 wt. % tridecylamine dissolved in kerosine.

Line 6 is provided to draw off and discharge a portion of the rhenium-free, molybdenum-containing alum solution, said solution being withdrawn at a rate substantially equivalent to the rate at which the rhenium and molybdenum-containing alum solution is charged to the system through line 1.

The remainder of the molybdenum-containing alum solution from contactor 3 is continued downwardly through line 5 to a second contactor 7 and stripped of molybdenum by the aforementioned amine solution charged upflow through the contactor from line 8. The resulting alum solution is withdrawn from contactor 7 by way of line 9 and charged to the top of a third contactor 10. The alum solution is charged to contactor 10 containing sufficient rhenium added thereto by way of line 11 to maintain an amine/rhenium mole ratio at the top of said contactor 10 of from about 0.7 to about 1.2. At these conditions, the rhenium-containing amine solution passing upwardly through contactor 10 is recovered overhead through line 13 free of molybdenum. The alum solution, charged via line 9, continues downwardly through contactor 10, containing molybdenum stripped from the amine solution, and passes through line 2 to be combined with the first mentioned rhenium and molybdenum-containing solution charged to the system through line 1.

A sample of the amine and alum solution is periodically taken from the top of contactor 10 and the bottom of contactor 3 and analyzed, for example, by spectrophotometric analysis, and the rhenium addition through line 11, and the amine addition through line 8 is varied accordingly to maintain the desired amine/rhenium mole ratios.

The recovery of rhenium from the amine solution can be effected by methods known to the art. For example, rhenium is readily recovered by back extraction utilizing various reagents including ammonia, ammonium carbonate, sodium carbonate, sodium hydroxide, nitric acid, and the like. Nitric acid is a particularly suitable extractant when the amine solution comprises a quarternary amine salt such as methyltridecyl ammonium chloride. One preferred method for use where the amine solution comprises a primary, secondary or tertiary amine consists of back extraction utilizing ammonia as the extractant. The resultant ammonia solution is boiled down to remove excess solvent and yield an ammonium perrhenate concentrate.

We claim as our invention:

1. A process for the recovery of rhenium from a molybdenum-containing alum solution resulting from the digestion of a spent platinum-rhenium-alumina catalyst in concentrated sulfuric acid, with a platinum-containing residue having been separated by filtration which comprises a. charging said alum solution downwardly through a first contactor column in contact with an amine solution charged upwardly therethrough at conditions to maintain an amine/rhenium mole ratio of from about 1.4 to about 1.8 in the lower portion of said column and extracting substantially all of the rhenium contained in said alum solution;

b. charging the resulting rhenium-containing amine solution upwardly through a second contactor column in contact with an alum solution charged downwardly therethrough and containing sufficient added rhenium to maintain an amine/rhenium mole ratio in the upper portion of said column of from about 0.1 to about 1.2, and stripping substantially all of the molybdenum from said rhenium-containing amine solution, and extracting a major portion of the rhenium contained in said alum solution;

c. charging the resulting molybdenum-containing alum solution downwardly through the first contactor column in admixture with the first mentioned alum solution charged thereto, and separating and recovering the molybdenum-free rhenium-containing amine solution;

d. discharging a portion of the molybdenum-containing alum solution passing downwardly through said first contactor column, and charging the remaining portion downwardly through a third contactor column in contact with an amine solution charged upwardly therethrough, extracting substantially all of the molybdenum contained in said alum solution, and charging the resulting alum solution and added rhenium downwardly through said second contactor column in accordance with step (a), and charging the resulting amine solution upwardly through the second contact column in accordance with step (a).

2. The process of claim 1 further characterized in that said amine solution comprises a water-immiscible aliphatic amine in a water-immiscible organic solvent.

3. The process of claim 1 further characterized in that said amine solution comprises a water-immiscible aliphatic amine with aliphatic chain links in the $C_5$–$C_{18}$ range, and a water-immiscible organic solvent.

4. The process of claim 1 further characterized in that said amine solution comprises a water-immiscible aliphatic tertiary amine with aliphatic chain links in the $C_5$–$C_{18}$ range and a water-immiscible organic solvent.

5. The process of claim 1 further characterized in that said amine solution comprises a water-immiscible quarternary amine with aliphatic chain links in the $C_5$–$C_{18}$ range and a water-immiscible organic solvent.

6. The process of claim 1 further characterized in that said amine solution comprises a tridecylamine in kerosine solution.

7. The process of claim 1 further characterized in that said amine solution comprises methyltridecyl ammonium chloride in kerosine solution.

* * * * *